May 5, 1970

F. LAWN 3,510,753

RIPPLE ELIMINATOR FOR PULSATING UNIDIRECTIONAL
CURRENT POWER SUPPLY

Filed Dec. 4, 1967

INVENTOR.
Francis Lawn
BY
Wood, Herron & Evans
ATTORNEY'S

United States Patent Office 3,510,753
Patented May 5, 1970

3,510,753
RIPPLE ELIMINATOR FOR PULSATING
UNIDIRECTIONAL CURRENT POWER
SUPPLY
Francis Lawn, Oakhurst, N.J., assignor to The Rowan
Controller Company, Westminster, Md., a corporation
of Maryland
Filed Dec. 4, 1967, Ser. No. 687,541
Int. Cl. G05f 1/64
U.S. Cl. 323—1                                    10 Claims

ABSTRACT OF THE DISCLOSURE

A circuit for eliminating or at least minimizing the time varying undulations, alternating component or ripple in the output of a pulsating unidirectional current power supply. The ripple eliminator circuit includes an auxiliary direct current source which is connected to the power supply output circuit via a selectively operable switch. The switch responds to the ripple peaks and valleys of the power supply output and meters current from the auxiliary source to the power supply output circuit in an amount necessary to fill the valleys in the power supply output current and thereby produce a total output current which is substantially constant with respect to time and, therefore, free of ripple.

This invention relates to circuitry for smoothing the ripple in a pulsating unidirectional current signal and, more particularly, to a circuit for smoothing the ripple of a full wave rectified signal.

Full wave rectifiers have long existed in the art and function to convert an alternating current signal, that is, a signal having alternate positive and negative one-half cycles, a pulsating unidirectional current. The pulsating unidirectional current can be considered as the sum of a constant, level or non-varying current component and an alternating or ripple current component. In many applications, a unidirectional current having an alternating or ripple component is perfectly satisfactory. However, in a number of applications, particularly including regulated direct current power supplies, a high or ripple component cannot be tolerated. In the later situations, it is necessary to reduce the ripple to an acceptable value, and to this end ripple eliminators or smoothing circuits are employed.

One of the most common prior art methods of eliminating ripple is to employ one or more L-section filters connected in the output circuit of the full wave rectifier. An L-section filter includes a series inductor connected in one if the rectifier output lines, and a shunt capacitor connected across the output lines at a point between the series inductor and the load. Both the inductor and the capacitor function independently to smooth the ripple; the inductor by resisting changes in current flow, and the capacitor by bypassing high frequency harmonics of the alternating current or ripple component.

One of the principal disadvantages of L-section filters is that in order to avoid saturation in the core of the series inductor, extremely massive cores must be utilized which give rise to excessive size and weight. For example, it is not uncommon for a full wave rectified power supply using L-section filters, which is rated at 40 volts–125 amperes, to weigh in excess of 300 pounds and have a volume equivalent to a cube measuring 20 inches per edge. Furthermore, even with filtered power supplies having the indicated dimensions and weight, the ripple is eliminated only to the extent of 99.5 percent of the unidirectional current output. This corresponds to a ripple factor of 0.5 percent, ripple factor being the ratio of the r.m.s. value of the alternating component and the direct current component. Thus, a conventional L-section filtered power supply rated at 40 volts–125 amperes has a 200 millivolt ripple at a unidirectional voltage output of 40 volts.

It has been an objective of this invention to provide a ripple eliminating circuit which not only permits a reduction in size and weight of a given full wave filtered power supply, but additionally improves the ripple factor of the output. This objective has been accomplished in accordance with the principles of this invention by utilizing a markedly different approach to the design of ripple eliminators which is predicated on the concept of using an auxiliary direct current source connected to the rectified power supply output for providing a supplemental flow of current having a magnitude which varies inversely with the instantaneous ripple current provided by the rectified power supply output, thereby effectively filling the ripple valleys to produce a combined or total current flow which is constant with respect to time.

In a preferred form of this invention, the ripple eliminator includes an auxiliary source of direct current and a variable impedance means, such as a transistor, responsive to the ripple voltage of the rectified power supply. The auxiliary source and transistor are connected in the rectified power supply output circuit in a manner such that the transistor meters a flow of current from the auxiliary source to the output circuit which is effective to fill the valleys of the ripple current, providing a combined or total output current which is substantially constant with respect to time.

It has been found that a ripple eliminator constructed in accordance with the principles of this invention can reduce the ripple factor of a filtered full wave rectified power supply to as low as 0.01 percent. This represents a ripple factor fifty times better than prior art units weighing twice as much.

Other objectives and advantages of this invention will be more readily apparent from a detailed description of the invention taken in conjunction with the accompanying drawings in which.

Figure 1:
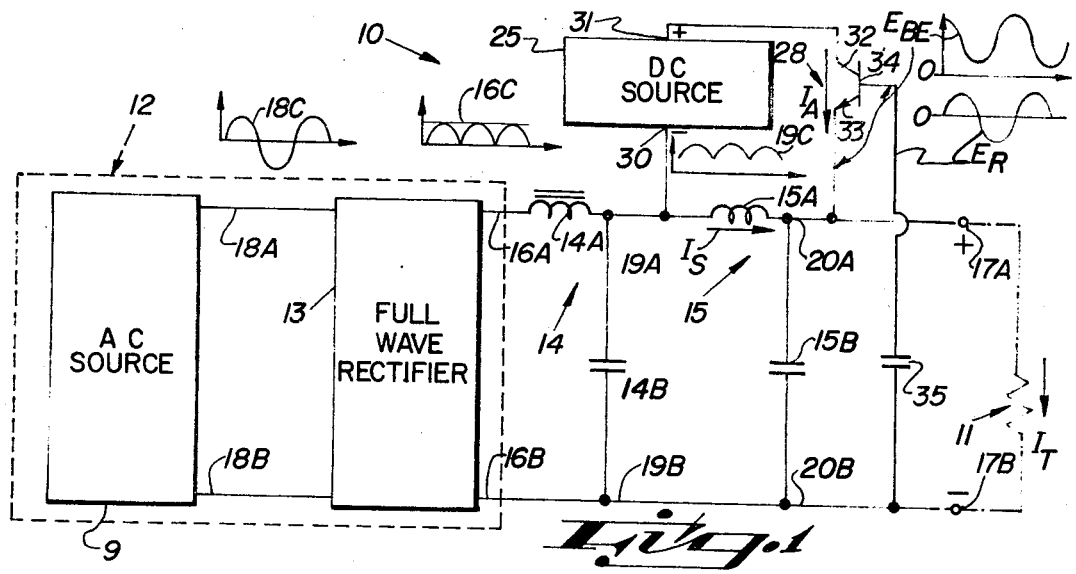
FIG. 1 shows a schematic electrical circuit diagram of a ripple eliminator constructed in accordance with the principles of this invention.

Referring to FIG. 1, a ripple eliminator circuit 10 is shown connected between a load 11, to which it is desired to supply ripple-free unidirectional current, and a source of pulsating unidirectional current 12 having an appreciable alternating component or ripple. The unidirectional current source 12 may be of any conventional type and may include, for example, an alternating current source 9 and a full wave rectifier 13. The alternating current source 9 provides an alternating output 18C across lines 18A and 18B. The full wave rectifier 13 responds to the alternating current source output 18C on lines 18A and 18B, providing across rectifier output lines 16A and 16B a pulsating unidirectional signal 16C which, because of the design of the full wave rectifier, has an appreciable alternating component or ripple.

The ripple eliminator 10, considered in detail, preferably includes two cascaded L-filter sections 14 and 15 connected between the full wave rectifier output lines 16A and 16B and a pair of input terminals 17A and 17B of the load 11. The filter sections 14 and 15 include series inductors or chokes 14A and 15A, respectively, and shunt capacitors 14B and 15B, respectively. The L-filter section 14 performs a preliminary filtering operation on the pulsating unidirectional current output 16C provided across lines 16A and 16B of the full wave rectifier 13, providing a partially smoothed signal 19C across lines 19A and 19B. The partially smoothed signal 19C is further filtered by L-filter section 15, providing across lines 20A and 20B a unidirectional signal which is smoother than that across lines 19A and 19B, but which still contains significant ripple.

The ripple eliminator 10 further includes an auxiliary source of direct current 25 and a variable impedance means, preferably in the form of an NPN transistor 28, the impedance of which is a function of the instantaneous magnitude of the ripple or alternating component of the filtered rectifier output across lines 20A and 20B. The auxiliary source 25 and the transistor 28 are connected such that the current flow from the source 25 into the load 11, which is metered by the transistor 28, fills or levels the valleys of the ripple, thereby providing a load current and voltage waveform which is substantially constant with respect to time. Specifically, the auxiliary source 25 is connected with its negative terminal 30 coupled to line 19A and its positive terminal 31 coupled to the collector 32 of transistor 28 to provide a forward bias between the collector 32 and a transistor emitter 33 which is connected to line 20A. The base 34 of the transistor 28 is connected to the negative line 20B via a coupling capacitor 35, and provides an input to the transistor which functions to vary the impedance of the emitter-collector path inversely with respect to the instantaneous value of the ripple of the output of filter section 15 present on lines 20A and 20B. Since transistor 28 functions as an A-C amplifier, conventional D-C biasing means (not shown) are utilized to provide the necessary D-C emitter-base bias level.

Figure 2:
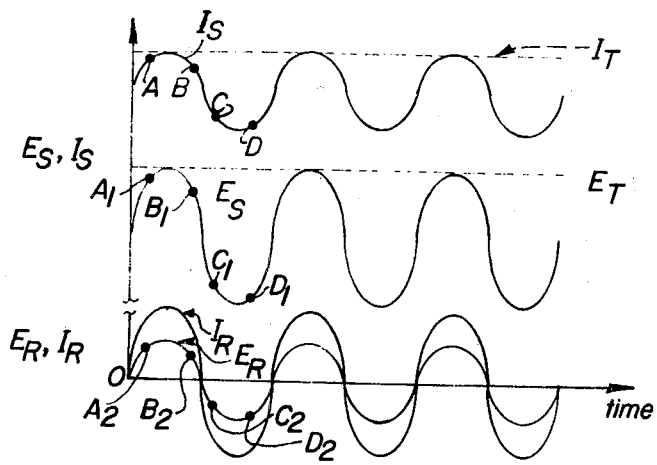
FIGS. 2–4 depict plots of current and/or voltage versus time for signals at different points in the circuit of FIG. 1.

Ignoring contributions to current through the load 11 supplied by the auxiliary source 25, that is, considering only the component of load current and voltage supplied by, or attributable to, the unidirectional current source 12, a unidirectional pulsating current represented by waveform $I_S$ of FIG. 2, flows through the load 11, providing a voltage drop across the load represented by the waveform $E_S$ also depicted in FIG. 2. The load voltage and current waveform $E_S$ and $I_S$, respectively, attributable to the output of the pulsating unidirectional current source 12, have alternating or ripple voltage and current components $E_R$ and $I_R$, respectively, also depicted in FIG. 2.

Figure 3:
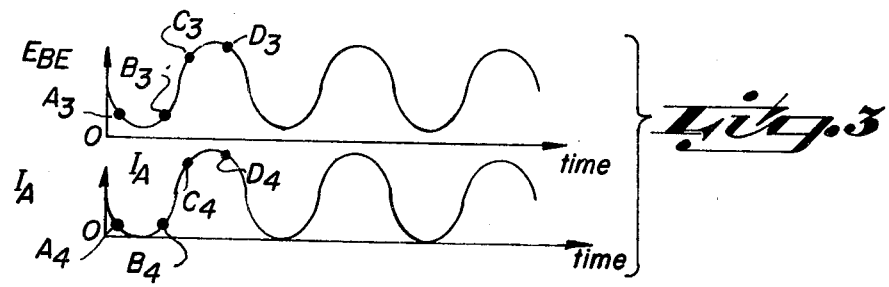
Figure 4:
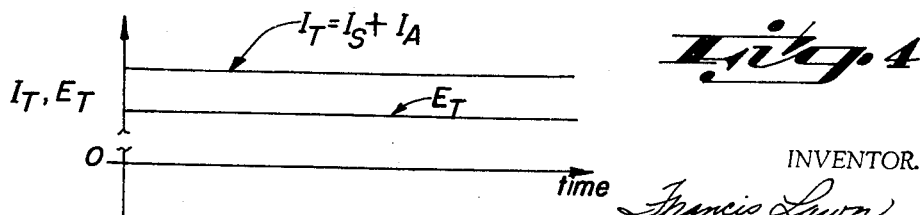

Thus, the current and voltage waveforms $I_S$, $I_R$, $E_S$, and $E_R$ depicted in FIG. 2 represent components of the load voltage and current which are attributable to the filtered output of the unidirectional current source 12. These components are to be distinguished from components of load current and voltage attributable to the auxiliary source 25. The auxiliary source 25, with the aid of the transistor 28, in a manner to be described, provides a pulsating unidirectional load current component $I_A$ depicted in FIG. 3 having an instantaneous magnitude such that when added to the current $I_S$ flowing in the load due to the unidirectional current source 12, a nonpulsating unidirectional current $I_T$ flows as depicted in FIG. 4.

In considering the operation of the ripple eliminator 10 of this invention, it is first assumed that the output from the unidirectional current source 12 provided across rectifier output lines 16A and 16B is completely free of ripple, that is, free of any alternating component. If the output of the unidirectional current source 12 is ripple-free, a constant unidirectional voltage appears across lines 20A and 20B. With a constant unidirectional voltage across lines 20A and 20B, no signal is input to the base 34 of transistor 28 due to the presence of coupling capacitor 35 which functions to block any direct current signals. In the absence of a signal input to the base 34 of transistor 28, the transistor is in its high impedance state and effectively functions as an open circuit. Consequently, no current flows in the transistor emitter-collector path from the auxiliary source 25 to the load 11. Thus, the total load current is attributable solely to the current provided by the unidirectional source 12.

Assume that the unidirectional current source 12 has a pulsating unidirectional output which, when filtered by filters 14 and 15, produces a signal which is input to the load 11 having the unidirectional pulsating voltage and current characteristics $E_S$ and $I_S$, respectively, depicted in FIG. 2. When the instantaneous value of the pulsating unidirectional current $I_S$ is only slightly below some desired constant value $I_T$, such as at points A or B of waveforms $I_S$, the instantaneous pulsating unidirectional voltage $E_S$ is also only slightly below some desired constant value $E_T$ corresponding to the current $I_T$, namely, at point $A_1$ or $B_1$ of waveform $E_S$.

The slightly undervalued instantaneous voltage at points $A_1$ or $B_1$ provides a slightly undervalued ripple voltage input to transistor base 34 via coupling capacitor 35. The slightly undervalued ripple voltage input is represented by the ripple voltage $E_R$ at points $A_2$ or $B_2$ of waveform $E_R$, and functions to provide a relatively small forward bias $E_{BE}$ on the base-emitter junction of the transistor, as represented by points $A_3$ or $B_3$ of the waveform $E_{BE}$ of FIG. 3. The base-emitter bias $E_{BE}$ produces a relatively small flow of current $I_A$ through the transistor collector-emitter path from the auxiliary source 25 to the load 11. This relatively small auxiliary current is represented by the current $I_A$ at points $A_4$ or $B_4$ of waveform $I_A$. The amount by which the instantaneous auxiliary current flow $I_A$ through the transistor 28 exceeds its lowest value is such as to equal the amount by which the instantaneous current $I_S$ provided by the unidirectional current source 12 is below its desired value $I_T$, providing a total load current which is substantially constant with respect to time. Load current $I_T$, in turn, produces a constant voltage $E_T$ across the load 11.

When the instantaneous pulsating unidirectional current $I_S$ is substantially below the desired value $I_T$, such as at points C or D, the instantaneous pulsating voltage $E_S$ is also substantially below the desired value of $E_T$ as represented by points $C_1$ or $D_1$. The substantially undervalued voltage $E_T$ at points $C_1$ or $D_1$ provides a ripple voltage input $E_R$ to the base 34 of transistor 28 via coupling capacitor 35. The ripple voltage input $E_R$ is substantially undervalued as represented by the ripple voltage at points $C_2$ or $D_2$, and provides a relaitvely large bias $E_{BE}$ on the base-emitter junction of transistor 28 as represented by point $C_3$ or $D_3$ of waveform $E_{BE}$. This large bias $E_{BE}$ causes transistor conduction at a relatively greater rate. Increased conduction of the transistor 28 enables a relatively larger amount of auxiliary current $I_A$ to flow from the source 25 through the transistor 28 into the load 11 as represented by the current levels at points $C_4$ and $D_4$ of waveform $I_A$. Again, the amount by which the instantaneous auxiliary current flow $I_A$ exceeds its minimum value is such that it just equals the amount by which the instantaneous current flow $I_S$ from the source 12 is below the desired constant level $I_T$, producing a total load current flow $I_T$ which is uniform with respect to time. The constant current $I_T$ produces across the load 11 a constant voltage $E_T$.

Since the transistor 28 conducts in only one direction, the unidirectional voltage of the auxiliary direct current source 25 is preferably selected such that the maximum current flow in the emitter-collector path of the transistor 28, which occurs when the instantaneous value of the current $I_S$ attributable to source 12 is at its minimum value, at least equals the maximum deviation in the unidirectional pulsating current provided by the source 12. This enables the auxiliary current source to provide, throughout an entire ripple cycle, an auxiliary current sufficient to produce a total current $I_T$ which is constant with respect to time. If the output voltage of the direct current source 25 is not so selected, the auxiliary current $I_A$ at points of minimum source current $I_S$, that is, during ripple valleys, is insufficient to raise the total current $I_T$ to the level which exists during ripple peaks. Consequently, at points corresponding to ripple valleys, the total current $I_T$ to the level which exists during ripple peaks. Consequently, at points corresponding to ripple valleys, the total current $I_T$ is less than at points corresponding to ripple peaks, producing a time varying total current.

The operation of the ripple eliminator circuit 10 has been described in terms of providing an auxiliary current flow to the load 11, the magnitude of which varies inversely with the instantaneous value of the load current component supplied by the source 12. It is also possible to view the operation of the ripple eliminator circuit 10 from a voltage standpoint. Specifically, the ripple eliminator circuit 10 may be considered as operative to monitor the ripple voltage appearing across lines 20A and 20B, phase invert the monitored ripple voltage via the A-C amplifier transistor 28 and apply the phase inverted ripple voltage across the impedance 15A. The application of the inverted ripple voltage across the series impedance 15A effectively bucks the ripple component of the unidirectional pulsating voltage provided by the source 12, providing a ripple-free net voltage across the load 11.

With the ripple eliminator circuit 10 considered as operative to apply across the source impedance 15A a bucking voltage equal in magnitude but opposite in polarity to the ripple voltage component of the pulsating unidirectional voltage, it will be obvious to one skilled in the art that this bucking voltage may be impressed across the series impedance 15A by means other than directly connecting the source terminal 30 and the transistor emitter 33 to opposite sides of the series impedance 15A. For example, the buckling voltage generated by the ripple eliminator circuit 10 may be impressed across the series impedance 15A inductively, using well-known transformer coupling techniques.

As those skilled in the art will appreciate, other filter networks may be utilized in conjunction with the ripple eliminator circuit 10 of this invention. For example, "Pi" and "T" section filters may be employed. Alternatively, the filter sections 14 and 15 may be eliminated entirely. If this is done, an inductive and/or resistive impedance means is connected in the output line of the source 12 between negative terminal 30 of source 25 and transistor emitter 37 to provide a voltage drop.

As those skilled in the art will also appreciate, the ripple eliminator circuit 10 depicted in FIG. 1 is merely representative of a preferred embodiment of the invention and numerous modifications can be made therein without departing from the spirit and scope of this invention. For example, the variable impedance means has been described as an NPN transistor 28 connected to the positive output line of the source 12. If desired, the variable impedance means may include a PNP transistor connected to the negative output line of source 12. Additionally, it will be obvious to one skilled in the art that the direct current source 25 and the transistor 28 may be series connected in reverse order. That is, the terminal collector 32 may be connected to the line 19A, the transistor emitter 33 may be connected to the negative terminal 30 of the direct current source 25, and the positive terminal of the source 25 may be connected to the line 20A.

I claim:
1. A circuit for minimizing the ripple component of a unidirectional pulsating signal output from a power supply having first and second terminals connectable to energize a load, said circuit comprising:
   an auxiliary source of direct current connected to one of said supply terminals for providing a variable auxiliary current to said load, and
   means connected in auxiliary current controlling circuit relationship with said auxiliary source, said means being responsive to said pulsating signal for controlling the instantaneous auxiliary current in inverse relationship to the instantaneous ripple component, thereby providing said load with a combined current from said power supply and auxiliary source which is substantially time invariant.

2. The circuit of claim 1 wherein said auxiliary current controlling means includes a variable impedance device connected in circuit with said auxiliary source, said device having an impedance which varies in direct relation to said instantaneous ripple component thereby inversely varying said instantaneous auxiliary current to produce said substantially time invariant combined current flow.

3. The circuit of claim 2 wherein said variable impedance device includes a transistor having an emitter-collector path connected in series with said auxiliary source and a base capacitively coupled to the other of said supply terminals for varying the impedance of said emitter-collector path in direct relation to said ripple component, thereby inversely varying said auxiliary flow to produce said substantially time invariant combined current.

4. A circuit for minimizing the ripple component of a unidirectional pulsating signal output from a power supply having first and second terminals connectable to energize a load, said circuit comprising:
   an auxiliary source of direct current connected to one of said supply terminals for providing a variable auxiliary current to said load,
   means connected in auxiliary current controlling circuit relationship with said auxiliary source including a variable impedance transistor having an emitter-collector path in series with said auxiliary source and a base capacitively coupled to the other of said supply terminals for varying the impedance of said emitter-collector path in direct relation to said ripple component, thereby varying said auxiliary flow in inverse relation to said instantaneous ripple component for providing said load with a combined current from said power supply and auxiliary source which is substantially time invariant,
   a series impedance connected between said one supply terminal and said load and in parallel with said source and said transistor emitter-collector path, and
   a shunt capacitor having one terminal connected between said impedance and said load and another terminal connected to said load and said coupling capacitor.

5. The circuit of claim 4 wherein said auxiliary source biases said transistor sufficiently to enable a maximum auxiliary current to flow which is at least as large as the maximum deviation of said unidirectional pulsating current.

6. A ripple eliminator for a direct current power supply having at least one series impedance comprising:
   an auxiliary direct current source having one terminal connected to one side of said impedance,
   at least one transistor connected between the other terminal of said direct current source and the other side of said impedance, and
   circuit means connecting the alternating current component across said load as an input signal to said transistor to vary the impedance of said transistor directly with the variation of voltage across the load, whereby said auxiliary direct current source supplies increased current to said load as the voltage across said load tends to decrease.

7. A ripple eliminator for a direct current power supply having a positive line containing a series inductor, a negative line, and a capacitance connected across the load side of said inductor and said negative line, said ripple eliminator comprising:
   an NPN transistor having an emitter, collector, and base,
   a direct current source having a negative terminal connected to the line side of said inductor, a positive terminal connected to a collector of said NPN transistor, the emitter of said transistor being connected to the load side of said inductor, and circuit means including a coupling capacitor connecting said negative line to said base of said transistor.

8. A circuit for minimizing the ripple component of a unidirectional pulsating signal output from a power supply having positive and negative lines connectable to energize a load, said circuit comprising:

series impedance means connected in one of said positive and negative lines between said power supply and said load, auxiliary circuit means including an auxiliary D.C. power supply means responsive to the ripple voltage of said unidirectional pulsating signal for generating and applying across said series impedance means a bucking voltage equal to magnitude but opposite in polarity to said ripple voltage for bucking said ripple voltage of said unidirectional pulsating signal thereby providing a substantially ripple-free voltage across said load.

9. A circuit for minimizing the ripple component of a unidirectional pulsating signal output from a power supply having positive and negative lines connectable to energize a load, said circuit comprising:

series impedance means connected in one of said positive and negative lines between said power supply and said load, and auxiliary circuit means including an auxiliary D.C. power supply and a variable impedance means series connected across said series impedance means, said variable impedance means being responsive to the ripple voltage of said unidirectional pulsating signal and having an impedance which varies in magnitude directly with the variation in magnitude of said ripple-eliminating voltage for generating and applying across said series impedance means a bucking voltage equal in magnitude but opposite in polarity to said ripple voltage for bucking said ripple voltage of said unidirectional pulsating signal thereby providing a substantially ripple-free voltage across said load.

10. The circuit of claim 9 wherein said variable impedance means includes a transistor having an emitter-collector path in series with said auxiliary direct current source and a base capacitively coupled to the other of said positive and negative lines for generating and impressing across said series impedance means said bucking voltage.

References Cited

UNITED STATES PATENTS 3,229,184    1/1966    Churchill _____ 321—10

OTHER REFERENCES

H. J. Paz, "Transistorized Filter For DC Power Supply," RCA Technical Note No. 102, RCA Laboratories, Princeton, N.J. 1958.

J D MILLER, Primary Examiner

A. D. PELLINEN, Assistant Examiner

U.S. Cl. X.R.

321—10